(12) United States Patent
Hase et al.

(10) Patent No.: US 6,809,140 B2
(45) Date of Patent: Oct. 26, 2004

(54) FIRE RESISTANT RESIN COMPOSITION AND ELECTRICAL WIRE HAVING FIRE RESISTANT COVERING

(75) Inventors: Tatsuya Hase, Yokkaichi (JP);
Takahiko Sugita, Yokkaichi (JP);
Hiroshi Fujimoto, Yokkaichi (JP);
Masashi Sato, Yokkaichi (JP); Shinichi Matsumoto, Yokkaichi (JP)

(73) Assignees: Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/756,341

(22) Filed: Jan. 14, 2004

(65) Prior Publication Data

US 2004/0147657 A1 Jul. 29, 2004

Related U.S. Application Data

(62) Division of application No. 10/012,517, filed on Dec. 12, 2001.

(30) Foreign Application Priority Data

| Dec. 12, 2000 | (JP) | 2000-377498 |
| Mar. 26, 2001 | (JP) | 2001-087906 |
| Mar. 26, 2001 | (JP) | 2001-087907 |
| Mar. 26, 2001 | (JP) | 2001-087908 |

(51) Int. Cl.⁷ .................................................. C08F 3/18
(52) U.S. Cl. ..................................... 524/433; 524/515
(58) Field of Search ................................. 524/433, 515

(56) References Cited

U.S. PATENT DOCUMENTS

| 3,294,868 A | 12/1966 | Pritchard |
| 3,737,557 A | 6/1973 | Verne et al. |
| 3,793,283 A | 2/1974 | Frailey et al. |
| 4,361,507 A | 11/1982 | Bourland |
| 4,361,508 A | 11/1982 | Bourland |
| 4,386,187 A | 5/1983 | Grancio et al. |
| 4,386,188 A | 5/1983 | Grancio et al. |
| 4,622,350 A | 11/1986 | Icenogle et al. |
| 4,622,352 A | 11/1986 | Djiauw et al. |
| 4,722,858 A | 2/1988 | Harbourne et al. |
| 4,734,450 A | 3/1988 | Kawai et al. |
| 4,794,132 A | 12/1988 | Djiauw et al. |
| 4,839,412 A | 6/1989 | Harrell et al. |

(List continued on next page.)

FOREIGN PATENT DOCUMENTS

| DE | 199 41 181 A1 | 5/2000 |
| DE | 199 41 180 A1 | 3/2001 |

(List continued on next page.)

*Primary Examiner*—William K. Cheung
(74) *Attorney, Agent, or Firm*—Oliff & Berridge, PLC

(57) ABSTRACT

A fire resistant resin composition, a method of making the fire resistant resin composition and an electrical wire comprising the fire resistant resin composition are provided. The fire resistant composition includes a halogen-free propylene resin containing propylene as its main monomer component, a halogen-free styrene-based thermoplastic elastomeric resin modified with an unsaturated carboxylic acid or a derivative of such an acid, and a fire resistant metal hydroxide.

20 Claims, 2 Drawing Sheets

U.S. PATENT DOCUMENTS

| | | |
|---|---|---|
| 4,853,154 A | 8/1989 | Icenogle et al. |
| 4,859,366 A | 8/1989 | Djiauw et al. |
| 4,871,805 A | 10/1989 | Shimomura et al. |
| 4,876,147 A | 10/1989 | Schlag et al. |
| 4,918,127 A | 4/1990 | Adur et al. |
| 4,987,173 A | 1/1991 | Nomura et al. |
| 4,990,554 A | 2/1991 | Nomura et al. |
| 5,045,589 A | 9/1991 | Ueno |
| 5,077,327 A | 12/1991 | Cecchin et al. |
| 5,166,250 A | 11/1992 | Breant |
| 5,180,889 A | 1/1993 | Rogers et al. |
| 5,354,795 A | 10/1994 | Ueno et al. |
| 5,418,272 A | 5/1995 | Kawabata et al. |
| 5,508,323 A | 4/1996 | Romenesko et al. |
| 5,561,185 A | 10/1996 | Hashimoto et al. |
| 5,747,574 A | 5/1998 | Kanamori |
| 5,760,141 A | 6/1998 | Watanabe et al. |
| 5,985,973 A | 11/1999 | Sumitomo et al. |
| 6,121,363 A | 9/2000 | Sakai et al. |
| 6,147,152 A | 11/2000 | Kanome et al. |
| 6,156,836 A | 12/2000 | Iwanami et al. |
| 6,169,144 B1 | 1/2001 | Higashi et al. |
| 6,190,772 B1 | 2/2001 | Yamano et al. |
| 6,255,390 B1 | 7/2001 | Enomoto et al. |
| 6,277,908 B1 | 8/2001 | Yamamoto |
| 6,306,972 B1 | 10/2001 | Ohkawa et al. |

FOREIGN PATENT DOCUMENTS

| | | |
|---|---|---|
| EP | 0 249 010 A2 | 12/1987 |
| EP | 0 273 516 A2 | 7/1988 |
| EP | 0 370 424 A2 | 5/1990 |
| EP | 0 370 518 A2 | 5/1990 |
| EP | 0 427 352 A1 | 5/1991 |
| EP | 0 490 394 A1 | 6/1992 |
| EP | 0 973 174 A1 | 1/2000 |
| EP | 1 033 384 A2 | 9/2000 |
| EP | 1 100 093 A2 | 5/2001 |
| EP | 1 130 054 A1 | 9/2001 |
| JP | 7-78518 | 2/1989 |
| JP | 7-110912 | 5/1989 |
| JP | 2-53845 | 2/1990 |
| JP | 4-154854 | 5/1992 |
| JP | 5-194795 | 8/1993 |
| JP | 5-301996 | 11/1993 |
| JP | 6-9805 | 1/1994 |
| JP | 6-157842 | 7/1994 |
| JP | 6-192504 | 7/1994 |
| JP | 7-78518 | 3/1995 |
| JP | 7-165997 | 6/1995 |
| JP | 165997 * | 7/1995 |
| JP | 7-176219 | 7/1995 |
| JP | 8-199016 | 8/1996 |
| JP | 9-31267 | 2/1997 |
| JP | 9-33770 | 2/1997 |
| JP | 10-330556 | 12/1998 |
| JP | 2000-315424 | 11/2000 |
| JP | 2000-340034 | 12/2000 |
| WO | WO 99/05688 | 2/1999 |
| WO | WO 99/27015 | 6/1999 |
| WO | WO 99/55776 | 11/1999 |

* cited by examiner

FIRE RESISTANT RESIN COMPOSITION AND ELECTRICAL WIRE HAVING FIRE RESISTANT COVERING

INCORPORATION BY REFERENCE

This is a Continuation of application Ser. No. 10/012,517 filed Dec. 12, 2001. The entire disclosure of the prior application is hereby incorporated by reference herein in its entirety.

BACKGROUND OF THE INVENTION

1. Field of Invention

This invention relates to a fire resistant or non-flammable resin composition, and a coated electrical wire including an electrical conductor and a covering made of the composition.

2. Description of Related Art

Polyvinyl chloride, which has superior flame resistance, is conventionally used as a coating material for electrical wire that is used in vehicles or electrical/electronic equipment. To obtain required characteristics in the wire, such as mechanical properties including wear resistance and tensile strength, along with flexibility and processability, additives such as plasticizers or stabilizers are added to the polyvinyl chloride in varying amounts.

Polyvinyl chloride has low flammability. However, it contains halogen, so when a vehicle or electrical/electronic equipment employing wire coated with polyvinyl chloride is burned, a harmful halogen gas is released into the atmosphere, thus causing environmental pollution.

In recent years, research has been conducted on fire resistant resin compositions that do not contain halogen. For example, a halogen-free resin composition disclosed in JP-A-5-301996 contains a mixture of a polyolefin and a high-density polyethylene, with a metal hydroxide added to the mixture as a fire resistant agent.

Another halogen-free fire resistant resin composition is disclosed in JP-B-7-110912. This composition contains a mixture of a thermoplastic elastomer and a polyolefin having a low crystallisability, with an inorganic fire resistant agent added to the mixture.

The electrical wire disclosed in JP-B-7-78518 includes a conductor covered with a cross-linked resin composition containing a mixture of a polyolefin having a melting point of not less than 120° C. and a carboxylic acid-modified polymer, with a surface-treated magnesium hydroxide added to the mixture.

However, in the case of the composition disclosed in JP-A-5-301996, it is necessary to add a large amount of metal hydroxide to the mixture of the polyolefin and the high-density polyethylene to achieve sufficient fire resistance, so that the composition is self-extinguishing. Due to the quantity of metal hydroxide, the composition has poor mechanical strength demonstrated by low wear resistance and tensile strength.

It is possible to increase the content of the high-density polyethylene, which is crystallizable and has comparatively high hardness, to improve the mechanical characteristics of such a composition. However, if the quantity of high-density polyethylene is increased, the composition has a small amount of non-crystalline material, and it is only possible to add small amounts of the fire resistant agent to the mixture. Consequently, the composition has reduced fire resistance and flexibility. Further, when the composition is used as a covering material for electrical wire, it has very poor processability and extrusion moldability. Thus, the composition is not satisfactory.

In the case of the composition disclosed in JP-B-7-110912, it is also necessary to add large amounts of an inorganic fire resistant agent to the mixture to achieve a self-extinguishing property. Consequently, as with the composition of JP-A-5-301996, the composition has poor mechanical strength as demonstrated by poor wear resistance, tensile strength, and the like. Further, due to the quantity of the fire resistant agent, the flexibility of the thermoplastic elastomer of the composition deteriorates. If the amount of the polyolefin is reduced to improve the mechanical characteristics of the composition, only a small amount of a non-crystalline material remains, and only a small amount of the fire resistant agent can be added. Consequently, the composition has poor fire resistance and does not possess the characteristics desired in wire manufacture.

In the case of the electrical wire of JP-B-7-78518, the resin composition of the covering is cross-linked. Thus, it is necessary to introduce a cross-linking step into the process of producing covered electrical wire. This additional step increases the number of manufacturing steps, in turn increasing the cost of manufacture.

SUMMARY OF THE INVENTION

Therefore, an object of this invention is to provide a fire resistant resin composition that does not generate halogen gas when burnt. Another object of this invention is to provide a composition having good mechanical characteristics including wear resistance, tensile strength, tensile elongation, and the like. An additional object of this invention is to provide a composition having good flexibility and processability.

Another object of this invention is to provide an electrical wire including an electrical conductor and a coating made of a fire resistant resin composition.

According to this invention there is provided a fire resistant resin composition including synthetic resin components:

(a) from about 60 to about 97 parts by weight of a propylene resin having propylene as its main monomer component by weight, and (b) from about 3 to about 40 parts by weight of a styrene-based thermoplastic elastomeric resin modified with an unsaturated carboxylic acid or a derivative thereof, components (a) and (b) being free of halogen, the total amount of components (a) and (b) being 100 parts by weight and there being no other synthetic resin components included in the composition, the composition further including:

(c) from about 30 to about 200 parts by weight of a fire resistant metal hydroxide per 100 parts by weight of components (a) and (b).

The invention further provides a method of making the resin composition by combining and mixing components (a), (b) and (c). Component (b) should preferably be modified with the unsaturated carboxylic acid or its derivative, before it is mixed with components (a) and (c).

The composition of this invention does not contain halogen, so it does not generate halogen gas when burned. In addition, the composition includes from 60 to 97 parts by weight of propylene resin, an olefin having a comparatively high melting point, making it possible to improve the heat resistance of the resin composition without cross-linking the polymer.

The composition contains from 3 to 40 parts by weight of styrene thermoplastic elastomer modified with an unsaturated carboxylic acid or derivative, so the composition is flexible. Further, a strong bonding interface is formed between the polar metal hydroxide, which acts as a fire resistant agent in the composition, and the modified styrene thermoplastic elastomer. Therefore, it is possible to improve mechanical characteristics of the resin composition including wear resistance, tensile strength, and tensile elongation without reducing the flexibility of the composition.

The resin composition of this invention is highly processable and moldable because the composition possesses a good balance of mechanical characteristics and flexibility. In addition, because the resin composition contains from 30 to 200 parts by weight of the metal hydroxide, it provides satisfactory fire resistance.

In various preferred embodiments, the styrene thermoplastic elastomer modified with the unsaturated carboxylic acid or the derivative thereof is a maleic anhydride-modified styrene thermoplastic elastomer. The metal hydroxide is preferably magnesium hydroxide. In embodiments where these components are employed, the resin composition has excellent mechanical characteristics such as wear resistance.

The electrical wire of this invention includes a conductor and the fire resistant resin composition applied to a peripheral surface of the conductor. It is preferable that the covering made of the resin composition has a thickness of from about 0.2 mm to about 0.3 mm.

These and other features and advantages of this invention are described in, or are apparent from, the following detailed description of various exemplary embodiments of this invention.

BRIEF DESCRIPTION OF THE DRAWINGS

Various exemplary embodiments of this invention will be described in detail, with reference to the following Figures, wherein.

DETAILED DESCRIPTION OF PREFERRED EMBODIMENTS

Figure 1:
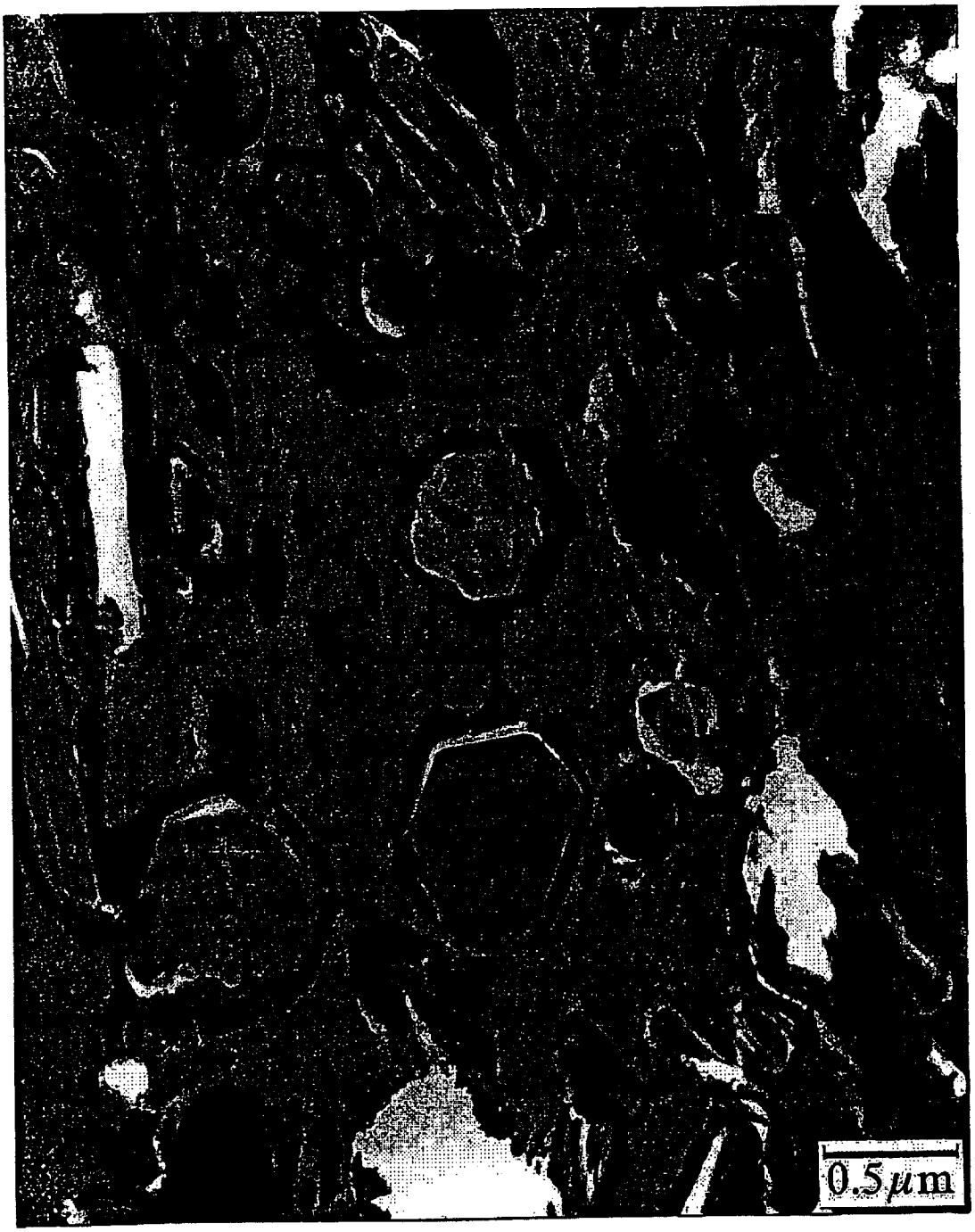
FIG. 1 is an electron micrograph of the structure of the resin composition of Example 11.

The propylene resin of the composition according to this invention is a polymer including propylene as its main monomer component (i.e. propylene monomer units constitute at least about 50% by weight of to the propylene resin). The propylene resin does not include halogen in its molecular structure. The propylene resin can be a homopolymer, a random copolymer, an alternating copolymer or a block copolymer.

In various exemplary embodiments according to this invention, the propylene resin can include polypropylene, a propylene-ethylene block copolymer containing propylene as its main monomer component (50% by weight or more), a propylene-ethylene random copolymer, a propylene-butane random copolymer, and a propylene/ethylene-propylene block copolymer (i.e., a block copolymer having segments of propylene/ethylene polymer and segments of polypropylene). These polymers can be used alone or in combination.

To improve the processability and extrusion moldability of the propylene resin, it is preferable that the propylene resin has a melt flow rate (MFR) in the range of from about 0.1 to about 5 g/10 minutes at a temperature of 230° C. and a load of 2.16 kg, as measured in accordance with JIS K 6758.

The styrene thermoplastic elastomer of the composition according to this invention is a styrene thermoplastic elastomer modified with an unsaturated carboxylic acid or derivative. The thermoplastic elastomer is a copolymer that is free of halogen. The thermoplastic elastomer is preferably a block copolymer including styrene polymer segments serving as hard segments and a rubbery polymer segment serving as soft segments. The thermoplastic elastomer thus has, in its molecular structure, the hard segment which functions in a manner similar to a cross-linking point and the soft segment having rubber-like elasticity at ambient temperature (25° C.). Thus, when the thermoplastic elastomer is heated, it is softened and plastically deformable by an external force (since it is not cross-linked) but is elastomeric at ambient temperature (e.g. 15–25° C.).

In various exemplary embodiments, the hard segment includes polystyrene, poly o-methylstyrene, poly m-methylstyrene, poly p-methylstyrene, poly á-methylstyrene, poly â-methylstyrene, polydimethylstyrene or polytrimethylstyrene. In various exemplary embodiments, the soft segment includes polybutadiene, an ethylene-propylene copolymer, an ethylene-propylene-diene tri-dimensional copolymer, polyisoprene, or a butadiene-isoprene copolymer. It is possible to use these styrene thermoplastic elastomers alone or in combination.

As the styrene thermoplastic elastomer, a styrene-butadiene block copolymer, a styrene/ethylene-propylene block copolymer and a styrene/ethylene butadiene block copolymer are preferred.

To improve the heat resistance of the resin composition, it is preferable to use a hydrogenated styrene thermoplastic elastomer having double bonds in its molecular chain saturated by hydrogen. In particular, a hydrogenated styrene/ethylene-propylene block copolymer and a hydrogenated styrene/butadiene block copolymer are preferred.

Subsequent to polymerization and hydrogenation, the thermoplastic elastomer is allowed to react with the unsaturated carboxylic acid or its derivative to form the modified styrene thermoplastic elastomer.

In various exemplary embodiments, unsaturated carboxylic acids which are used to modify the styrene thermoplastic elastomer can include maleic acid, fumaric acid, itaconic acid, acrylic acid, and the like. Derivatives of unsaturated carboxylic acids include maleic anhydride, monoester maleate, diester maleate, fumaric anhydride, monoester fumarate, diester fumarate, itaconic anhydride, monoester itaconate, diester itaconate, and the like. Of these derivatives, maleic anhydride is preferred. Modification with maleic anhydride improves mechanical characteristics, such as wear resistance, of the resin composition.

It is preferable that the modification ratio of the modified styrene thermoplastic elastomer is from about 0.1 to about 10 wt %(weight of modifying unsaturated carboxylic acid or derivative). If the modification ratio is less than about 0.1 wt %, the chemical bonding strength of the thermoplastic elastomer to the surface of the metal hydroxide decreases, and thus a strong bonding interface cannot be obtained. Thus, the effect obtained by the modification is liable to be small. If the modification ratio is more than about 10 wt %, the various characteristics of the resin composition do not balance well with one another.

In various exemplary embodiments, the metal hydroxide of this invention includes magnesium hydroxide, aluminum hydroxide or calcium hydroxide. Magnesium hydroxide is most preferred because its decomposition temperature is as high as about 360° C. It is preferable that the average particle diameter of the metal hydroxide is from about 0.1 μm to about 20 μm to improve the mechanical characteristics, such as wear resistance, of the composition. In various exemplary embodiments, the resin composition of this invention is free from fibrous fillers. In various exemplary embodiments, the metal hydroxide or combination of metal hydroxide is the only filler present in the resin composition.

To enhance the dispersibility of the metal hydroxide in the polymer and its reactivity with the polymer, the particles of the metal hydroxide may be surface-treated with a silane coupling agent such as aminosilane, vinylsilane, epoxysilane or methacryloxysilane or with a higher fatty acids such as stearic acid or oleic acid.

The components of the resin composition according to this invention can be combined by mixing and kneading by conventional methods that permit adjustment of the mixing ratio. In various exemplary embodiments, the main components (i.e., the two synthetic resins and the metal hydroxide) are mixed and kneaded together simultaneously, in a single-step mixing process. In various other embodiments, the modified styrene-based resin is mixed with the metal hydroxide first, and then the propylene resin is added. In various exemplary embodiments, the styrene-based resin is modified with the unsaturated carboxylic acid or derivative thereof prior to mixing the styrene-based resin with the other two main components. Thus, the modified styrene-based resin is mixed with the metal hydroxide in a state in which the unsaturated carboxylic acid (or derivative) modifying group has not reacted with another compound.

It has been found that the modified styrene-based polymer has a high affinity for the hydroxide due to the presence of the carboxylic acid or derivative thereof. Therefore the modified styrene-based resin more easily adheres to the hydroxide particles than the propylene polymer. A morphology is thus achieved in which the styrene-based polymer coats the filler particles and the propylene polymer fills the space between the coated filler particles. In this "spotted" or "island" structure, the propylene polymer is in a "continuous phase" and the coated filler particles are in a "discontinuous phase." This morphology is illustrated by micrographs of the resin composition, described later with reference to the Examples.

If the mixing ratio of the propylene resin is less than about 60 parts by weight, the wear resistance of the composition tends to be low. If the mixing ratio of the propylene resin is more than about 97 parts by weight, the flexibility and processability of the composition tend to be low. If the mixing ratio of the modified styrene thermoplastic elastomer is less than about three parts by weight, the flexibility and processability of the composition tend to be low. If the mixing ratio of the modified styrene thermoplastic elastomer is more than about 40 parts by weight, the wear resistance of the composition tends to be low.

If the mixing ratio of the metal hydroxide is less than about 30 parts by weight per 100 parts by weight of the polymers, the composition is not sufficiently fire resistant. If the mixing ratio of the metal hydroxide is more than about 200 parts by weight per 100 parts by weight of the polymers, the composition has a low degree of tensile elongation, wear resistance, flexibility, and processability.

It is preferable that from about 70 to about 90 parts by weight of the propylene resin are mixed with from about 10 to about 30 parts by weight of the styrene thermoplastic elastomer modified with the unsaturated carboxylic acid or its derivative and that from about 50 to about 150 parts by weight of the metal hydroxide is added to 100 parts by weight of the mixture of the propylene resin and the modified styrene thermoplastic elastomer.

In various exemplary embodiments, the composition contains other additives, provided that the additives do not deteriorate the characteristics of the composition. Typical conventional additives include halogen-free antioxidants, metal-inactivating agents such as copper inhibitors and the like, processing aids such as lubricants, waxes, and the like, colorants and flame retarding additives such as zinc borate and silicon flame retarding additives.

However, as mentioned above, the composition contains no synthetic resin component other than the propylene resin and the modified styrene-based thermoplastic elastomeric resin. Furthermore, the composition should contain no component, other than the metal hydroxide, which reacts with the unsaturated carboxylic acid or derivative thereof of the modified styrene-based resin. It is desired that the modified styrene-based resin bonds directly to the metal hydroxide, to improve the mixing and dispersion of the metal hydroxide particles in the composition.

The propylene resin and the modified styrene thermoplastic elastomer are highly compatible with each other, so it is possible to form a uniform composition without damaging the various characteristics of the modified styrene thermoplastic elastomer. The resin composition according to this invention has good processability and moldability because the composition achieves a balance between mechanical characteristics and flexibility. Accordingly, the composition has appropriate hardness and flexibility.

In embodiments where the composition contains from about 70 to about 90 parts by weight of the propylene resin mixed with from about 10 to about 30 parts by weight of the styrene thermoplastic elastomer modified with the unsaturated carboxylic acid or its derivative and from about 50 to about 150 parts by weight of the metal hydroxide per 100 parts by weight of the polymers, the composition has improved mechanical characteristics such as wear resistance, tensile strength and tensile elongation. Such a resin composition also achieves an excellent balance between these characteristics.

The covered electrical wire of this invention is obtained by coating the peripheral surface of a conductor with the above-described composition. The wire may be obtained by applying the composition to the peripheral surface of the conductor concentrically. In various exemplary embodiments, the conductor includes a plurality of intertwined soft copper wires, in accordance with JIS C 3102, or a plurality of soft copper wires intertwined with each other and circularly compressed.

Preferably, the conductor is covered with the composition to a thickness of from about 0.2 mm to about 0.3 mm. If the coating thickness is less than about 0.2 mm, the covered wire may suffer from deteriorated wear resistance. If the coating thickness is greater than about 0.3 mm, the covered wire may suffer from deteriorated flexibility.

In various exemplary embodiments, one or more layers of a water-resistant, halogen-free resin composition are interposed between the fire resistant composition and the conductor.

To obtain the covered wire according to this invention having superior characteristics, it is necessary to select an optimum mixing ratio of the components of the fire resistant composition that is applied to the conductor as the coating material. The ratio can be selected with consideration for the cross-sectional area of the conductor and the coating thickness of the resin composition.

For example, when the cross-sectional area of the conductor is from about 0.35 mm$^2$ to about 1.5 mm$^2$ and the coating thickness is about 0.2 mm, it is preferable to mix the components of the fire resistant composition at the following ratio: about 90 parts by weight of the propylene resin and about 10 parts by weight of the modified styrene thermoplastic elastomer, with about 70 parts by weight of the metal hydroxide per 100 parts by weight of the polymers.

When the cross-sectional area of the conductor is from about 0.22 mm$^2$ to about 1.5 mm$^2$ and the coating thickness is from about 0.2 mm to about 0.3 mm, it is preferable to mix the components of the fire resistant composition at the following ratio: about 80 parts by weight of the propylene resin and about 20 parts by weight of the modified styrene thermoplastic elastomer, with about 90 parts by weight of the metal hydroxide per 100 parts by weight of the polymers.

When the cross-sectional area of the conductor is more than about 1.5 mm$^2$ and the coating thickness is more than about 0.2 mm, it is preferable to mix the components of the composition at the following ratio: from about 60 to about 70 parts by weight of the propylene resin and from about 30 to about 40 parts by weight of the modified styrene thermoplastic elastomer, with from about 70 to about 90 parts by weight of the metal hydroxide per 100 parts by weight of the polymers.

When the covered wire is narrow, to obtain a satisfactory fire resistance, it is preferable to mix the components of the composition at the following ratio: from about 65 to about 97 parts by weight of the propylene resin and from about 3 to about 35 parts by weight of the modified styrene thermoplastic elastomer, with from about 100 to about 200 parts by weight of the metal hydroxide per 100 parts by weight of the polymers.

In this case, it is more preferred to mix the components of the composition at the following ratio: from about 70 to about 95 parts by weight of the propylene resin and from about 5 to about 30 parts by weight of the modified styrene thermoplastic elastomer, with from about 120 to about 180 parts by weight of the metal hydroxide per 100 parts by weight of the polymers.

When the cross-sectional area of the conductor is about 0.13 mm$^2$ and the coating thickness is 0.2 mm, it is preferable to mix the components of the composition at the following ratio: about 90 parts by weight of the propylene resin and from about 10 to about 40 parts by weight of the modified styrene thermoplastic elastomer, and about 160 parts by weight of the metal hydroxide per 100 parts by weight of the polymers.

The electrical wire of the present invention is highly fire resistant and has good mechanical characteristics, flexibility, and processability. Furthermore, because a cross-linking process is not required in forming the composition, it is unnecessary to use cross-linking equipment in manufacturing the electrical wire. Thus, the number of steps in the manufacturing processes is reduced, in turn reducing the cost of manufacture.

Accordingly, in various exemplary embodiments of the resin composition of this invention, the composition is free from cross-linking agents, such as a peroxide. The composition, as applied as a wire covering, can also be free from cross-linking agents. However, if desired, cross-linking can be performed, for example, chemically or by electron beam or ultraviolet irradiation.

The covered wire according to this invention has good processability. When the end of the coated electric wire is peeled from the conductor, a whiskery coating material does not remain on the end of the wire. Accordingly, when the conductor is used in combination with a crimping terminal, a whiskery coating does not become sandwiched between the conductor and the crimping terminal. It is thus possible to avoid unwanted resistance. That is, when the covering is peeled from the conductor, the wire remains highly operable.

To obtain an electrical wire according to this invention having improved resistance to whitening upon bending and having good flexibility, it is preferred that the electrically insulating covering on the conductor is a composition having a 2% tensile stress of not more than about 7 MPa. Preferably the 2% tensile strength is at least about 2 MPa. It is also preferred that the 300% tensile stress of one of the polymer components of the composition is not more than about 5 MPa. In particular, it is desirable for the styrene-based thermoplastic elastomer to have a 300% tensile stress of not more than about 5 MPa.

It is preferred that the 2% tensile stress of the polymer composition is from about 5 to about 7 MPa when the coating thickness is about 0.2 mm or less, and from about 2 to about 6 MPa when the coating thickness is from about 0.2 mm to about 0.3 mm. Namely, when the coating is thinner, the tensile stress of the polymer composition can be chosen to be comparatively large, and when the coating is thicker, the tensile stress can be chosen to be comparatively small. When the tensile stress of the polymer composition is selected in this manner, flexibility of the coated electric wire is obtained in both thin and thick coatings.

EXAMPLES

This invention is illustrated by the following Examples, which are merely for the purpose of illustration and are not to be regarded as limiting the scope of the invention, or the manner in which it may be practiced. In the Tables, quantities are given in parts by weight.

In each of the Examples and Comparative Examples below, the components were continuously mixed and kneaded as follows. The two resin components and the metal hydroxide were fed simultaneously into the input hopper of a twin-shaft extruder having an electrical heating jacket. This extruder was employed to knead the components together. The extruder temperature (inner surface) was 200° C. at entry, rising to 250° C. at exit. At the exit end there was an extrusion head for forming strands from the mixed composition. The extrusion head was maintained at a temperature of 260° C. The resulting strands were passed through a water bath to a pelletizer, to form pellets. The pellets were used to make wire covering, as described below.

Examples 1–10 and Comparative Examples 1–9

In Examples 1–5 and Comparative Examples 1–5, resin compositions were prepared by kneading components in the quantities shown in Tables 1 and 2, respectively.

To evaluate the characteristics of each composition, electrical wires were prepared by applying each composition at a thickness of 0.28 mm to a conductor (seven soft copper wires twisted together and circularly compressed to give a smooth peripheral surface) having a cross-sectional area of 0.5 mm$^2$, using an extrusion molding machine. The die nipples used in the extrusion molding were 1.40 mm and 0.88 mm in diameter. The extrusion temperature of the die was 210° C. to 230° C. The extrusion temperature of the cylinder was 200° C. to 240° C. The linear speed was 50 m/minute.

In Examples 6–10, resin compositions were prepared by kneading components in the quantities shown in Table 3. The mixing ratios of these compositions were selected to be used preferably in electrical wire having a small diameter.

In Comparative Examples 6–9, resin compositions were prepared by kneading components in the quantities shown in Table 4.

To evaluate the characteristics of each of the compositions in Examples 6–10 and Comparative Examples 6–9, electrical wires were prepared by applying each composition at a thickness of 0.20 mm to a conductor (seven soft copper wires twisted together and circularly compressed to give a smooth peripheral surface) having a cross-sectional area of 0.13 mm$^2$, using an extrusion molding machine. The die nipples used in the extrusion molding were 0.50 mm and 0.90 mm in diameter. The extrusion temperature of the die was 210° C. to 230° C. The extrusion temperature of the cylinder was 200° C. to 240° C. The linear speed was 50 m/minute.

The Examples and Comparative Examples were tested to evaluate fire resistance, wear resistance, tensile strength, tensile elongation, flexibility, and processability, as described below.

A fire resistance test was conducted in accordance with JASO D611-94, of the Japanese Automobile Standards Organization. Electrical wire was cut to a length of 300 mm to prepare a specimen. Each specimen was put in a test box made of iron and supported horizontally. Using a Bunsen burner having a bore of 10 mm, the tip of a reducing flame was applied to the underside of the center of each specimen to burn the specimen for 30 seconds. An after-flame time was measured for each specimen. Specimens having an after-flame time of less than 15 seconds were regarded as successful. Specimens having an after-flame time of more than 15 seconds were regarded as failures.

In accordance with JASO OG11-94, a wear resistance test was conducted by a blade reciprocation method. The covered electrical, wire was cut to a length of 750 mm to prepare a specimen. At a room temperature of 23±5° C., the surface of the coating material of each specimen fixed to a table was worn by axially reciprocating a blade at a rate of 50 times per minute over a length more than 10 mm. A load of 7 N was applied by the blade. The number of reciprocations of the blade was measured until the blade contacted the conductor due to the wear of the coating material.

Then, each specimen was moved 100 mm and rotated 90 degrees clockwise and the measurement by the above-described method was repeated. The test was performed three times on each specimen. In Examples 1–5 and Comparative Examples 1–5, specimens for which the blade reciprocated more than 150 times were regarded as successful. In Examples 6–10 and Comparative Examples 6–10, specimens for which the blade reciprocated more than 100 times were regarded as successful.

In accordance with JASO D611-94, tensile strength and tensile elongation tests were conducted. Each covered electrical wire was cut to a length of 150 mm to prepare a specimen. The conductor was removed from the specimen to form a tubular body. Lines were marked on the center of the specimen at intervals of 50 mm. At a room temperature of 23±5° C. the ends of the specimen were mounted on chucks of a tensile testing machine. Then, the specimen was drawn at a speed of 200 m/minute to measure the load and the length between adjacent marked lines when the specimen was cut (broken). Specimens having a tensile strength of more than 15.7 MPa and a tensile elongation of more than 125% were regarded as successful.

To evaluate flexibility, specimens were bent by hand. Those specimens giving a good feeling when they were bent by hand were regarded as successful.

To test processability, a part of the resin composition disposed at the end of each covered wire was peeled off of the conductor to check whether a whisker was formed. Specimens on which no whisker was formed were admitted as successful.

The results are shown below in Tables 1–4.

TABLE 1

|  | E1 | E2 | E3 | E4 | E5 |
|---|---|---|---|---|---|
| P-E polymer A[1] | 60 | 97 | 80 | 90 | 80 |
| MAH-SEBS A[2] | 40 | 3 | 20 | 10 | 20 |
| Magnesium hydroxide A[3] | 70 | 90 | — | — | 90 |
| Magnesium hydroxide B[4] | — | — | 50 | 200 | — |
| Antioxidant[5] | 1 | 1 | 1 | 1 | 1 |
| Total (parts by weight) | 171 | 191 | 151 | 301 | 191 |
| Fire resistance | Pass | Pass | Pass | Pass | Pass |
| Wear resistance (reciprocation number of blade) | 500 | 1800 | 4000 | 300 | 2000 |
| Tensile strength (MPa) | 28 | 31 | 34 | 23 | 33 |
| Tensile elongation (%) | 200 | 420 | 520 | 160 | 320 |
| Flexibility | Good | Good | Good | Good | Good |
| Processability | Pass | Pass | Pass | Pass | Pass |

In Table 1:
"E" denotes an Example of the present invention.
[1]P-E Polymer A: POLYPRO RB610A manufactured by Tokuyama Corporation; a propylene-ethylene block copolymer with a propylene content of more than 50% by weight; MFR = 0.5 g/10 minutes at a density of 0.90, a temperature of 230° C. and a load of 2.16 kg.
[2]MAH-SEBS: TUFTEC M1913 manufactured by Asahi Kasei Corporation; a maleic anhydride-modified hydrogenated styrene-butadiene-styrene copolymer which is a thermoplastic elastomer; MFR = 5.0 g/10 minutes at a density of 0.92, a temperature of 230° C. and a load of 2.16 kg.
[3]Magnesium hydroxide A: manufactured by Kyowa Chemicals Co., Ltd.; average diameter of particles: 1.0 μm; surface-treated with a vinyl silane coupling agent.
[4]Magnesium hydroxide B: manufactured by Kyowa Chemicals Co., Ltd.; average diameter of particles: 1.0 μm; not surface-treated.
[5]Antioxidant: TOMINOX TT manufactured by Yoshitomi Fine Chemicals; a hindred phenol-based antioxidant.

TABLE 2

|  | CE1 | CE2 | CE3 | CE4 | CE5 |
|---|---|---|---|---|---|
| P-E polymer A[1] | 99 | 50 | 70 | 70 | 80 |
| MAH-SEBS A[2] | 1 | 50 | 30 | 30 | — |
| SEBS[6] | — | — | — | — | 20 |
| Magnesium hydroxide A[3] | 70 | — | 20 | — | 90 |
| Magnesium hydroxide B[4] | — | 80 | — | 250 | — |
| Anitoxidant[5] | 1 | 1 | 1 | 1 | 1 |
| Total (parts by weight) | 171 | 181 | 121 | 351 | 191 |
| Fire resistance | Pass | Pass | Fail | Pass | Pass |
| Wear resistance (reciprocation number of blade) | 1500 | 90 | 1300 | 75 | 140 |
| Tensile strength (MPa) | 35 | 20 | 40 | 16 | 37 |
| Tensile elongation (%) | 670 | 110 | 600 | 80 | 710 |
| Flexibility | Bad | Good | Good | Bad | Good |
| Processability | Fail | Pass | Pass | Fail | Pass |

In Table 2:
"CE" denotes Comparative Example.
[1]–[5]See Table 1.
[6]SEBS: TUFTEC H1041 manufactured by Asahi Kasei Corporation; a hydrogenated styrene-butadiene-styrene copolymer; MFR = 5.0 g/10 minutes at a density of 0.91, a temperature of 230° C and a load of 2.16 kg.

TABLE 3

|  | E6 | E7 | E8 | E9 | E10 |
|---|---|---|---|---|---|
| P-E polymer A[1] | 95 | 90 | 80 | 65 | 80 |
| MAH-SEBS A[2] | 5 | 10 | 20 | 35 | 20 |
| Magnesium hydroxide B[4] | 120 | 150 | 200 | 160 | 100 |
| Anitoxidant[5] | 1 | 1 | 1 | 1 | 1 |
| Total (parts by weight) | 221 | 251 | 301 | 261 | 201 |
| Fire resistance | Pass | Pass | Pass | Pass | Pass |
| Wear resistance (reciprocation number of blade) | >500 | >500 | >500 | 180 | >500 |
| Tensile strength (MPa) | 32 | 30 | 32 | 30 | 19 |
| Tensile elongation (%) | 260 | 220 | 210 | 250 | 265 |
| Flexibility | Good | Good | Good | Good | Good |
| Processability | Pass | Pass | Pass | Pass | Pass |

In Table 3:
"E" denotes an Example.
[1,2,4,5]See Table 1.

TABLE 4

|  | CE6 | CE7 | CE8 | CE9 |
|---|---|---|---|---|
| P-E polymer A[1] | 99 | 55 | 70 | 90 |
| MAH-SEBS A[2] | 1 | 45 | — | 10 |
| SEBS[6] | — | — | 30 | — |
| Magnesium hydroxide B[4] | 160 | 120 | 150 | 220 |
| Antioxidant[5] | 1 | 1 | 1 | 1 |
| Total (parts by weight) | 261 | 221 | 251 | 321 |
| Fire resistance | Pass | Pass | Pass | Pass |
| Wear resistance (reciprocation number of blade) | >500 | 60 | 75 | >500 |
| Tensile strength (MPa) | 33 | 30 | 27 | 33 |
| Tensile elongation (%) | 220 | 280 | 320 | 180 |
| Flexibility | Bad | Good | Good | Bad |
| Processability | Fail | Pass | Pass | Fail |

The coated wire of each of Examples 1–5 of this invention was satisfactory in fire resistance, wear resistance, tensile strength, tensile elongation, flexibility and process ability. On the other hand, none of the coated wires of Comparative Examples 1–5 provided satisfactory results for all of the measured characteristics.

In particular, the resin composition of each of Examples 3 and 5 shown in Table 1 had preferable mechanical strength properties such as wear resistance, tensile strength and tensile elongation, and a good balance between these characteristics. Each of these compositions contained 70 to 90 parts by weight of the propylene resin and 10 to 30 parts by weight of the styrene thermoplastic elastomer modified with the unsaturated carboxylic acid or its derivative and 50 to 150 parts by weight of the metal hydroxide per 100 parts by weight of the mixture of the polymers.

As shown in Table 2, in the composition of Comparative Example 1, the mixing ratio of the propylene-ethylene block copolymer was high, and the mixing ratio of the maleic anhydride-modified hydrogenated styrene-butadiene-styrene copolymer was low. Thus, this composition had poor flexibility and processability. In the composition of Comparative Example 2, the mixing ratio of the propylene-ethylene block copolymer was low, and the mixing ratio of the maleic anhydride-modified hydrogenated styrene-butadiene-styrene copolymer was high. Thus, this composition had poor tensile elongation and wear resistance. In the composition of Comparative Example 3, the mixing ratio of the magnesium hydroxide was low. As a result, this composition had poor fire resistance. In the composition of Comparative Example 4, the mixing ratio of the magnesium hydroxide was high. As a result, this composition had insufficient tensile elongation, and gave poor results in evaluations of wear resistance, flexibility, and processability.

In the composition of Comparative Example 5, instead of the maleic anhydride-modified hydrogenated styrene-butadiene-styrene copolymer, the unsaturated hydrogenated styrene-butadiene-styrene copolymer was used. Thus, a strong bonding interface was not formed between the metal hydroxide and the hydrogenated styrene-butadiene-styrene copolymer. Consequently, this composition demonstrated poor wear resistance.

The wire of each of Examples 6–10 of this invention was satisfactory in fire resistance, wear resistance, tensile strength, tensile elongation, flexibility and processability. On the other hand, none of the wires Comparative Examples 6–9 provided satisfactory results for all of the characteristics.

As shown in Table 4, in the composition of Comparative Example 6, the mixing ratio of the propylene-ethylene block copolymer was high, and the mixing ratio of the maleic anhydride-modified hydrogenated styrene-butadiene-styrene copolymer was low. Thus, this composition gave poor results in tests of flexibility and processability. In the composition of Comparative Example 7, the mixing ratio of the propylene-ethylene block copolymer was low, and the mixing ratio of the maleic anhydride-modified hydrogenated styrene-butadiene-styrene copolymer was high. Thus, this composition provided low wear resistance.

In the composition of Comparative Example 8, instead of the maleic anhydride-modified hydrogenated styrene-butadiene-styrene copolymer, the unsaturated hydrogenated styrene-butadiene-styrene copolymer was used. Thus, a strong bonding interface was not formed between the metal hydroxide and the hydrogenated styrene-butadiene-styrene copolymer. As a result, the composition demonstrated poor wear resistance.

In the composition of Comparative Example 9, the mixing ratio of the magnesium hydroxide was high. As a result, this composition provided poor results in tests of flexibility and processability.

Example 11

80 parts by weight of the propylene-ethylene block copolymer described above (MFR=0.5 g/10 min.), 20 parts by weight of the modified styrene-based elastomer described above and 90 parts by weight of magnesium hydroxide (untreated) were kneaded with a twin-screw extruder at 250° C. A micrograph of the resulting composition was produced with a transmission electron microscope (TEM) (model H-800 by HITACHI) at an acceleration voltage of 100KV. The sample was cut to a thickness of about 10 μm by a microtome for an electron microscope, and the cut sample was dyed with ruthenic acid (2% aqueous solution) for 2 hours. Then, the dyed sample was mounted in an epoxy resin, and a micrograph was obtained using an ultra thin intercept method. The micrograph is shown in FIG. 1.

As illustrated by FIG. 1, the approximately hexagonal particles which are situated at the central part of the picture and the surrounding narrow long particles are the particles of magnesium hydroxide. The dense portion forming a rim around each of these particles is the modified styrene-based elastomer that coats the particles, and the material filling the space between the particles is the continuous matrix phase of the propylene-ethylene block copolymer. FIG. 1 demonstrates that the filler particles hardly coagulate, and are finely dispersed in the continuous phase of the propylene-ethylene block copolymer.

Comparative Example 10

A composition was prepared in like manner as in Example 1 except that the unsaturated hydrogenated styrene-butadiene-styrene copolymer, not modified with maleic anhydride, was used in place of the modified styrene-based elastomer. A micrograph was obtained and is shown in FIG. 2.

Figure 2:
FIG. 2 is an electron micrograph of the structure of the resin composition of Comparative Example 10.

Comparison of FIGS. 1 and 2 demonstrates that the this styrene-based polymer modified by unsaturated carboxylic acid, by reason of its affinity with the magnesium hydroxide filler particles, forms a structure in the mixture in which it surrounds the particles preferentially. This is advantageous for obtaining the properties desirable in compositions used in wire covering.

Examples 12 to 21 and Comparative Examples 11 and 12

In Examples 12–21 and Comparative Examples 11–12, resin compositions were prepared by kneading components in the quantities shown in Tables 5 and 6.

To evaluate the characteristics of each of the compositions in Examples 12–21 and Comparative Examples 11–12, electrical wires were prepared by applying each composition at a thickness of 0.28 mm to a conductor (seven soft copper wires having a diameter of 0.32 mm twisted together and circularly compressed to give a smooth peripheral surface) having a cross-sectional area of 0.5 mm$^2$, using an extrusion molding machine. The die nipples used in the extrusion molding were 1.40 mm and 0.88 mm in diameter. The extrusion temperature of the die was 210° C. to 230° C. The extrusion temperature of the cylinder was 200° C. to 240° C. The linear speed was 50 m/minute.

The flame resistance, wear resistance and tensile strength/elongation, flexibility and processability were evaluated in the same manner as above. In evaluating wear resistance, 150 or more blade reciprocations was regarded as successful.

TABLE 5

|  | E12 | E13 | E14 | E15 | E16 | CE11 |
|---|---|---|---|---|---|---|
| P-E polymer A[1] | 60 | 97 | 80 | 90 | 80 | 80 |
| MAH-HSBR[7] | 40 | 3 | 20 | 10 | 20 | — |
| HSBR[8] | — | — | — | — | — | 20 |
| Magnesium hydroxide[3] | 70 | 90 | — | — | 90 | 80 |
| Magnesium hydroxide[4] | — | — | 30 | 200 | — | — |
| Antioxidant[5] | 1 | 1 | 1 | 1 | 1 | 1 |
| Total | 171 | 191 | 131 | 301 | 191 | 191 |
| Tensile elongation (%) | 300 | >500 | >500 | 170 | >500 | >500 |
| Tensile Strength (MPa) | 27 | 30 | 31 | 24 | 30 | 34 |
| Fire Resistance | Pass | Pass | Pass | Pass | Pass | Pass |
| Wear resistance (blade reciprocation number) | 400 | 1500 | 2500 | 260 | 1800 | 10 |
| Flexibility | Good | Good | Good | Good | Good | Bad |
| Processability | Pass | Pass | Pass | Pass | Pass | Fail |

In Table 5:
"E" denotes Example and "CE" denotes Comparative Example.
[1,3–5]See Table 1.
[7]MAH-HSBR: DYNARON 1320P manufactured by JSR Corporation; a hydrogenated styrene-butadiene rubber modified with 1% by weight of maleic anhydride; density = 0.89; Shore A hardness 41; MFR = 3.5 g/10 min. at 230° C. and load of 2.16 kg.
[8]HSBR: DYNARON 1320P manufactured by JSR Corporation; a hydrogenated styrene-butadiene rubber; density = 0.89; Shore A hardness 41; MFR = 3.5 g/10 min. at 230° C. and load of 2.16 kg.

TABLE 6

|  | E17 | E18 | E19 | E20 | E21 | CE12 |
|---|---|---|---|---|---|---|
| P-E polymer A[1] | 60 | 97 | 80 | 90 | 80 | 80 |
| MAH-SEPS[9] | 40 | 3 | 20 | 10 | 20 | — |
| SEPS[10] | — | — | — | — | — | 20 |
| Magnesium hydroxide A[3] | 70 | 90 | — | — | 90 | 80 |
| Magnesium hydroxide B[4] | — | — | 30 | 200 | — | — |
| Antioxidant[5] | 1 | 1 | 1 | 1 | 1 | 1 |
| Total | 171 | 191 | 131 | 301 | 191 | 191 |
| Tensile elongation (%) | 250 | >500 | >500 | 170 | >500 | >500 |
| Tensile Strength (MPa) | 25 | 28 | 26 | 27 | 28 | 27 |
| Fire Resistance | Pass | Pass | Pass | Pass | Pass | Pass |
| Wear resistance (blade reciprocation number) | 400 | 1300 | 1200 | 260 | 1700 | 90 |
| Flexibility | Good | Good | Good | Good | Good | Good |
| Processability | Pass | Pass | Pass | Pass | Pass | Pass |

In Table 6:
"E" denotes Example and "CE" denotes Comparative Example.
[1,3–5]See Table 1.
[9]MAH-SEPS: SEPTON 2043 manufactured by Kuraray Co., Ltd.; a hydrogenated styrene-isoprene block copolymer modified with 1% by weight of maleic anhydride; density = 0.89; Shore A hardness 38; MFR = 4 g/10 min. at 230° C. and load of 2.16 kg.
[10]SEPS: SEPTON 2043 manufactured by Kuraray Co., Ltd.; a hydrogenated styrene-isoprene block copolymer; density = 0.89; Shore A hardness 38; MFR = 4 g/10 min. at 230° C. and load of 2.16 kg.

Example 22 and Comparative Examples 13 and 14

In Example 22 and Comparative Examples 13 and 14, resin compositions were prepared by kneading components in the quantities shown in Table 7. The obtained composition was extrusion-molded to a coating thickness of 0.28 mm around a conductor having a cross-sectional area of 0.5 mm$^2$ (7/SB: twisted wire which is composed of seven soft copper wires having a diameter of 0.30 mm). The die nipples used had diameters of 1.40 mm and 0.88 mm, in the extrusion molding. The extrusion temperature was 240° C. to 250° C. for the die and 230° C. to 250° C. for the cylinder, and the extrusion molding was carried out at a linear velocity of 50 m/min.

To test for whitening, the obtained coated electrical wire was bent in a standard manner, and was visually evaluated to determine whether the coating had whitened or not. Results are shown in Table 1, which also gives the 2% tensile stress of the coating composition.

The flexibility of the coated electrical wire was evaluated as follows. An article which was obtained by bundling 30 pieces of the coated electric wire having a length of 350 mm and roughly winding the bundle with a vinyl tape is made as a sample. The sample was mounted on a pair of cylinders (each having a diameter of 19 mm) which were arranged mutually parallel and spaced horizontally which a gap of 100 mm, with the sample perpendicular to the axes of the cylinder so that the center of the sample was situated at the center of the gap between the cylinders. The sample was slowly pulled downward at the center between the cylinders at room temperature, and the maximum load born while the sample remained on the cylinders was measured. In the test, a maximum load of 70 N or less for a coating thickness of 0.20 mm, and a maximum load of 50 N or less for a coating thickness of 0.28 mm, were regarded as passing.

TABLE 7

|  | E22 | CE13 | CE14 |
|---|---|---|---|
| MAH-SEBS 1[2] | 20 | | |
| MAH-SEBS 2[11] | | | 10 |
| SEBS epoxy[12] | | 5 | |
| P-E Polymer A[1] | 80 | 95 | |
| HDPE[14] | | | 90 |
| Magnesium hydroxide B[4] | 100 | 100 | 100 |
| Antioxidant[5] | 1 | 1 | 1 |
| 2% Tensile stress (MPa) | 5.8 | 7 | 9 |
| Whitening on bending | No | Yes | Yes |
| Flexibility | Pass | Reject | Reject |

Examples 23 and Comparative Examples 15 and 16

Components were kneaded by a twin-screw extruder at 250° C., in the in Table 8. The obtained composition was extrusion-molded to a coating thickness of 0.20 mm or 0.28 mm around a conductor having a cross-sectional area of 0.5 mm$^2$ (7/SB: twisted wire which is composed of seven soft copper wires having a diameter of 0.30 mm). Die nipples in extrusion molding were 1.25 mm and 0.88 mm in diameter for coating thickness of 0.20 mm and 1.40 mm and 0.88 mm in diameter for a coating thickness of 0.28 mm. The extrusion temperature was 240° C. to 250° C. for the die and 230° C. to 240° C. for the cylinder. The extrusion molding was carried out at a linear velocity of 50 m/min.

Flexibility and whitening were evaluated as described above. The results are shown in Table 8.

TABLE 8

|  | E23 | CE15 | CE16 |
|---|---|---|---|
| P-E Polymer A[4] | 90 | 95 | |
| HDPE[14] | | | 90 |
| MAH-SEBS 1[2] | 10 | 5 | |
| MAH-EPR[16] | | | 10 |
| Magnesium hydroxide B[4] | 80 | 100 | 100 |
| Antioxidant[5] | 1 | 1 | 1 |
| Coating thickness (mm) | 0.20 | 0.20 | 0.28 |
| 2% Tensile stress (MPa) | 7.0 | 9.0 | 7.3 |
| Whitening on bending | No | Yes | Yes |
| Flexibility | Pass | Reject | Reject |

In Table 8:
"E" denotes Example and "CE" denotes Comparative Example.
[1,2,5]See Table 1.
[14,15]See Table 7.
[16]MAH-EPR: T7741P manufactured by JSR Corporation, Ltd.; density = 0.86; MFR at 230° C. with a load of 2.16 kg = 0.9 g/10 min.

Examples 24 to 33

In Examples 24 to 28, components were kneaded in the ratios shown in Table 9 to prepare resin compositions.

To check the characteristics of each composition, using an extrusion molding machine, each composition was applied at a thickness of 0.28 mm to a conductor (seven soft copper wires twisted together and circularly compressed to give a smooth peripheral surface) having a cross-sectional area of 0.5 mm$^2$ to prepare an electrical wire. The die nipples used in the extrusion molding were 1.40 mm and 0.88 mm in diameter. The extrusion temperature of the die was 210° C. to 230° C. The extrusion temperature of the cylinder was 200° C. to 240° C. The linear speed was 50 m/min.

In Examples 29 to 33, components were kneaded at the ratios shown in Table 10 to prepare resin compositions. The mixing ratios of these compositions were selected to be preferably used in electrical wire having a small diameter.

To check the characteristics of the compositions of Table 10, each composition was applied at a thickness of 0.20 mm to a conductor (seven soft copper wires twisted together and circularly compressed to give a smooth peripheral surface) having a cross-section area of 0.13 mm$^2$, using an extrusion molding machine to prepare the covered wire. The die nipples used in the extrusion molding had diameters of 0.50 mm and 0.90 mm. The extrusion temperature of the die was 210° C. to 230° C. The extrusion temperature of the cylinder was 200° C. to 240° C. The linear speed was 50 m/minute.

The covered electrical wires of Examples 24 to 33 were tested to evaluate their fire resistance, wear resistance, tensile strength, tensile elongation, flexibility, and processability, as described above. In Examples 24–28, specimens for which the blade reciprocated more than 150 times were regarded as successful. In Examples 29–33, specimens for which the blade reciprocated more than 100 times were regarded as successful.

Tables 9 and 10 show the components of each resin composition and the evaluated results for each electrical wire.

TABLE 9

|  | E5 | E6 | E7 | E8 | E9 |
|---|---|---|---|---|---|
| P-E Polymer A[1] | 60 | 97 | 80 | 90 | 80 |
| MAH-SEBS 1[2] | 40 | 3 | 20 | 10 | 20 |
| Magnesium hydroxide A[3] | 70 | 90 | — | — | 90 |
| Magnesium hydroxide B[4] | — | — | 50 | 200 | — |
| Antioxidant[5] | 1 | 1 | 1 | 1 | 1 |
| Total (parts by weight) | 171 | 191 | 151 | 301 | 191 |
| Fire resistance | Pass | Pass | Pass | Pass | Pass |
| Wear resistance (reciprocation number of blade) | 500 | 1800 | 4000 | 300 | 2000 |
| Tensile strength (MPa) | 28 | 31 | 34 | 23 | 33 |
| Tensile elongation (%) | 200 | 420 | 520 | 160 | 320 |
| Flexibility | Good | Good | Good | Good | Good |
| Processability | Pass | Pass | Pass | Pass | Pass |

In Table 9:
"E" denotes Example.
[1–5]See Table 1.

TABLE 10

|  | E10 | E11 | E12 | E13 | E14 |
|---|---|---|---|---|---|
| P-E Polymer A[1] | 95 | 90 | 80 | 65 | 80 |
| MAH-SEBS 1[2] | 5 | 10 | 20 | 35 | 20 |
| Magnesium hydroxide B[4] | 120 | 150 | 200 | 160 | 1000 |
| Age resister[5] | 1 | 1 | 1 | 1 | 1 |
| Total (parts by weight) | 221 | 251 | 301 | 261 | 201 |
| Fire resistance | Pass | Pass | Pass | Pass | Pass |
| Wear resistance (reciprocation number of blade) | >500 | >500 | >500 | 180 | >500 |
| Tensile strength (MPa) | 32 | 30 | 32 | 30 | 29 |
| Tensile elongation (%) | 260 | 220 | 210 | 250 | 265 |
| Flexibility | Good | Good | Good | Good | Good |
| Processability | Pass | Pass | Pass | Pass | Pass |

In Table 10:
"E" denotes Example.
[1,2,4,5]See Table 1.

The coated wire in each of Examples 5 to 14 was thus satisfactory in fire resistance, wear resistance, tensile strength, tensile elongation, flexibility and processability. In particular, the resin compositions in each of Examples 7 and 9, shown in Table 3, had preferable mechanical strength properties such as wear resistance, tensile strength and tensile elongation and a good balance between these characteristics. Each of these compositions contained 70 to 90 parts by weight of the propylene resin and 10 to 30 parts by weight of the styrene thermoplastic elastomer modified with the unsaturated carboxylic acid or its derivative and 50 to 150 parts by weight of the metal hydroxide per 100 parts by weight of the mixture.

In summary, according to this invention, an electrical wire is obtained that avoids whitening on bending even when a filler is present, and that has good flexibility.

This is not limited to the above-described embodiments. It is possible to make various modifications within the general scope of this invention. For example, although the antioxidant was used as an additive in various embodiments, other conventional additives may also be used as appropriate. Exemplary additives include halogen-free antioxidants, metal-inactivating agents (copper inhibitors or the like), processing aids (lubricants, waxes, and the like), colorants, flame retarding agents (zinc borate, silicon flame retarding agents).

As described above, the resin composition according to this invention provides excellent fire resistance without generating halogen gas when burned. The resin composition provides good mechanical characteristics including wear resistance, tensile strength, tensile elongation and the like, while also providing good flexibility and processability. A superior coated electrical wire can be achieved by coating a conductor with the resin composition according to this invention.

While this invention has been described in conjunction with the specific embodiments above, it is evident that many alternatives, combinations, modifications, and variations are apparent to those skilled in the art. Accordingly, the exemplary embodiments of this invention, as set forth above are intended to be illustrative, and not limiting. Various changes can be made without departing from the spirit and scope of this invention.

What is claimed is:

1. A method of making a fire resistant resin composition comprising mixing together the following components (a), (b) and (c):
   (a) from about 60 to about 97 parts by weight of a propylene resin containing propylene as its main monomer component by weight; and
   (b) from about 3 to about 40 parts by weight of a styrene-based thermoplastic elastomeric resin modified with an unsaturated carboxylic acid or a derivative of an unsaturated carboxylic acid; and
   wherein components (a) and (b) are free of halogen, and the total amount of components (a) and (b) is 100 parts by weight and there are no other synthetic resin components included in the composition,
   (c) from about 30 to about 200 parts by weight of fire resistant metal hydroxide per 100 parts by weight of components (a) and (b).

2. The method of claim 1, wherein component (b) is a styrene-based thermoplastic elastomeric resin modified with maleic anhydride, and the metal hydroxide is magnesium hydroxide.

3. The method of claim 1, wherein component (a) has a melt flow rate of from about 0.1 to about 5 g/10 minutes.

4. The method of claim 1, wherein component (b) is a block copolymer having hard segments formed of a monomer selected from styrene and styrene derivatives, and soft segments having elasticity at ambient temperature.

5. A method of making a fire resistant resin composition comprising mixing together the following components (a), (b) and (c):
   (a) from about 80 to about 90 parts by weight of a propylene resin containing propylene as its main monomer component by weight; and (b) from about 10 to about 20 parts by weight of a styrene-based thermoplastic elastomeric resin modified with maleic anhydride;
   wherein components (a) and (b) are free of halogen, the total amount of components (a) and (b) is 100 parts by weight and there are no other synthetic resin components included in the composition,
   the composition further comprising:
   (c) from about 70 to about 90 parts by weight of magnesium hydroxide per 100 parts by weight of components (a) and (b).

6. The method of claim 5, wherein the propylene resin is selected from the group consisting of a propylene homopolymer, an ethylene-propylene block copolymer and an ethylene-propylene random copolymer.

7. The method of claim 5, wherein the styrene-based thermoplastic elastomeric resin is a styrene/ethylene-butylene/styrene block copolymer modified with maleic anhydride.

8. The method claim 5, wherein the magnesium hydroxide has not been subjected to a surface treatment.

9. The method of claim 5, wherein the fire resistant resin consists essentially of (a), (b) and (c).

10. The method of claim 1, wherein the propylene resin has a melt flow rate in the range of from about 0.1 to about 5 g/10 minutes at a temperature of 230° C. and a load of about 2.16 kg.

11. The method of claim 1, wherein components (a), (b) and (c) are mixed together simultaneously, in a single-step mixing process.

12. The method of claim 1, wherein components (b) and (c) are mixed together and then component (a) is added.

13. The method of claim 1, wherein the styrene-based thermoplastic elastomeric resin is modified with the unsaturated carboxylic acid or the derivative of a carboxylic acid prior to mixing with component (c).

14. The method of claim 1, wherein the styrene-based thermoplastic elastomeric resin bonds directly to the fire resistant metal hydroxide.

15. The method of claim 1, wherein the styrene-based thermoplastic elastomeric resin is formed from a styrene thermoplastic elastomer selected from the group consisting of: styrene-butadiene block copolymer, styrene/ethylene-propylene block copolymer, and styrene/ethylene butadiene block copolymer.

16. The method of claim 15, wherein the styrene thermoplastic elastomer is hydrogenated.

17. The method of claim 1, wherein the modified styrene-based thermoplastic elastomeric resin has a modification ratio of from about 0.1 to about 10 wt %.

18. The method of claim 1, wherein the average particle diameter of the metal hydroxide is from about 0.1 $\mu$m to about 20 $\mu$m.

19. The method of claim 1, wherein the fire resistant resin composition is free from fibrous fillers.

20. The method of claim 1, wherein the metal hydroxide is the only filler.

* * * * *